May 31, 1960 D. E. STEER 2,938,561
SNAP-ON TUBELESS TRUCK TIRE VALVE
Filed Oct. 5, 1956
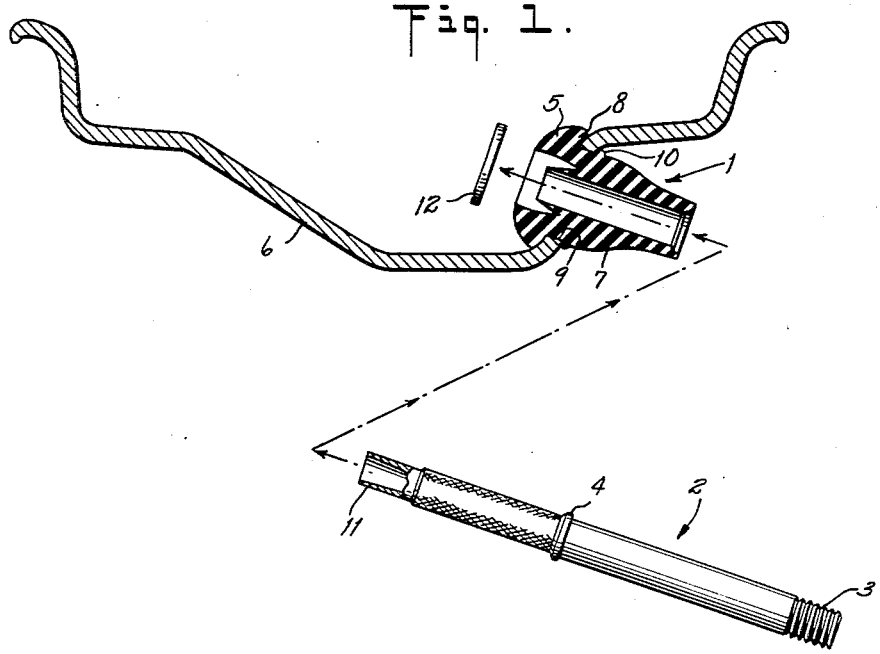
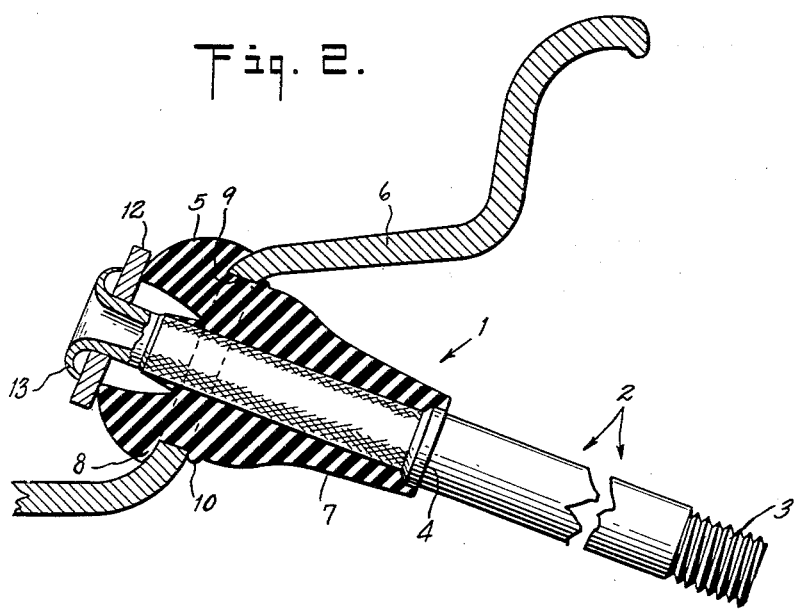
INVENTOR.
DONALD E. STEER
BY
Kenyon & Kenyon
ATTORNEYS

# United States Patent Office 2,938,561
Patented May 31, 1960

2,938,561

SNAP-ON TUBELESS TRUCK TIRE VALVE

Donald E. Steer, Stratford, Conn., assignor to Bridgeport Brass Company, Bridgeport, Conn., a corporation of Connecticut Filed Oct. 5, 1956, Ser. No. 614,299

5 Claims. (Cl. 152—427)

The present invention relates to a valve stem assembly for use with tubeless tires and more particularly to a valve stem assembly for use with tubeless truck tires which may be snapped in and out of an aperture in a tubeless tire rim.

The air pressure in tubeless truck tires is considerably higher than the air pressure in tubeless tires used for passenger automobiles. When a conventional type of snap-on tubeless tire valve is used in tubeless truck tires the high pressure will tend to completely extrude the valve out of the rim hole if the material from which the valve is made fails, resulting in a blowout of the valve. The objects of this invention, therefore, are to provide a tubeless truck tire valve which is shaped in such a manner that it may be readily snapped into and removed from a tubeless tire rim that has an appropriate aperture, that will resist displacement due to ordinary pressures and forces during ordinary usage of the assembly and that will prevent the valve from being completely extruded out of the rim hole when the material from which the valve is made fails.

Further objects of the invention will be apparent from a reference to the specification herein and the accompanying drawings.

In said drawings:

Figure 1 is a fragmentary cross-section through a wheel rim, valve stem and valve stem mounting assembly before the valve stem has been assembled, and Figure 2 is a fragmentary cross-section through a wheel rim, valve stem and valve stem mounting assembly after the valve stem has been assembled.

The valve stem, which is generally denoted by the numeral 1, is formed of a resilient material such as rubber. Extending longitudinally through the valve stem is a rigid tubular insert 2 which is threaded both externally and internally at its outer end 3. The external threading is complementary to the internal threading on a protective cap (not shown) and is adapted to cooperate with and secure the protective cap. The internal threading is adapted to cooperate with and secure an ordinary valve core which seats against the beveled edge 4 which extends around the inner circumference of the tubular insert 2.

As illustrated in Figures 1 and 2 the external shape of the valve stem 1 is preferably of varying diameters. It is to be understood, however, that the valve stem 1 may also be a straight tubular resilient body. The inner portion 5 of the valve stem 1, that is the portion of the valve stem extending inside the rim of the wheel 6, is preferably of a substantially hemispherical shape, while the outer portion 7 of the valve stem 1, or the portion of the valve stem extending outside of the rim of the wheel 6, is preferably of a substantially conical shape. At the junction of the inner portion 5 with the outer portion 7 of the valve 1, the inner portion extends radially beyond the outer portion to form a shoulder 8. This shoulder 8 extends around the outer circumference of the valve stem 1 and is concave or cup-shaped in contour. When the valve stem 1 is snapped into position in the wheel rim aperture 9, the shoulder 8 abuts against the inner face of the wheel rim 6 and tends to hold the valve stem in position.

The outer portion 7 of the valve stem 1 is also formed with a bead 10 extending around the outer circumference of the valve stem. When the valve stem 1 is snapped into position in the wheel rim aperture 9 the bead 10 abuts against the outer face of the wheel rim 6. The purpose of this bead 10 is to indicate the position of the valve stem 1 in the wheel rim 6, that is the valve stem 1 is completely inserted when the bead 10 is visible and abutting against the outer face of the wheel rim 6.

Referring to Figure 1 when the tubular insert 2 is inserted in the valve stem 1, the inner of the tubular insert 11 protrudes above the inner 5 of the valve stem 1. The valve stem is assembled by placing the tubular insert 2 inside the valve stem 1. For purposes of this invention the tubular insert 2 may be integrally attached to the valve stem 1. After the tubular insert 2 is placed inside the valve stem 1, a washer 12 is mechanically attached to the inner end of the tubular insert 2. This is accomplished by placing the washer 12 over the tubular insert 2 so that the inner 11 of the tubular insert 2 extends through the hole in the washer 12, and then bending the inner 11 of the tubular insert 2 radially outward to form a flange 13 extending around the outer circumference of the tubular insert 2. The diameter of this flange 13 is greater than the diameter of the hole in the washer 12, thereby effectively retaining the washer 12 between the inner 5 of the valve stem 1 and the flange 13. The washer 12 is preferably of a greater diameter than the diameter of the aperture 9 in the wheel rim 6. Thus if the rubber base of the valve 1 fails the washer 12 will prevent the rubber base from being completely extruded through the aperture 9 in the wheel rim 6, thereby preventing a blowout of the valve stem 1 while still maintaining an air seal.

It should be noted that the aperture 9 in the wheel rim 6 is preferably of a smaller diameter than the diameter of the outer of the valve stem 1 adjacent the shoulder 8 before the valve stem is snapped into the wheel rim. When the valve stem 1 is snapped into the aperture 9 in the wheel rim 6 the portion of the wheel rim surrounding the aperture 9 will therefore press radially against the valve stem and aid the shoulders 8 in holding the valve stem in a stable position with relation to the wheel rim. The rigid tubular insert 2 acts to keep the air passage running longitudinally through the valve stem open even though this compressure holding pressure is utilized.

The tire valve described above is economical to manufacture and quick and simple to install and therefore maintains all of the desirable features of snap-in valves with the additional safety factor that if the rubber base of the valve stem fails the valve will not be blown out of the aperture in the wheel rim. This is of particular importance with the high pressures utilized in tubeless truck tires.

Having thus described my invention, I claim:

1. In combination with a wheel rim having an aperture therethrough, of a tubeless tire valve comprising a resilient valve stem disposed through said aperture and in substantial contact radially with the portion of said rim surrounding said aperture and radially compressed thereby, a separately formed rigid tubular insert extending longitudinally in non-integral contact through said stem, said insert having a portion extending inwardly from the inner end of said stem and a portion extending outwardly from the outer end of said stem, a valve disposed within said insert, and a rigid washer engaged by said inwardly extending portion, said washer having an outer diameter greater than said aperture whereby complete extrusion of said valve stem through said aperture is prevented.

2. Apparatus as defined in claim 1 wherein the inner end of said inwardly extending portion of said insert is bent radially outward to form a flange, said washer being clamped between said flange and the inner end of said stem.

3. Apparatus as defined in claim 1 wherein the portion of said stem disposed inwardly from said aperture has a substantially hemi-spherical shape, the portion of said stem disposed outwardly from said aperture having a substantially conical shape.

4. Apparatus as defined in claim 1 wherein the inner end of said inwardly extending portion of said insert is bent radially outward to form a flange, said washer being clamped between said flange and the inner end of said stem, and wherein the portion of said stem disposed inwardly from said aperture has a substantially hemispherical shape, the portion of said stem disposed outwardly from said aperture having a substantially conical shape.

5. Apparatus as defined in claim 4 wherein the outwardly extending portion of said insert is of somewhat larger diameter than the portion of said insert surrounded by said valve stem, the substantially hemispherical portion of said valve stem is of somewhat larger maximum diameter than the substantially conical portion of said valve stem, and a circumferential bead appears on the substantially conical portion of said valve stem, said bead being separated from the substantially hemispherical portion of said valve stem by a distance equal to the thickness of said wheel rim at said aperture.

References Cited in the file of this patent
UNITED STATES PATENTS

| | | |
|---|---|---|
| 666,887 | Row | Jan. 29, 1901 |
| 2,210,112 | Crowley | Aug. 6, 1940 |
| 2,500,531 | Eger | Mar. 14, 1950 |
| 2,769,476 | Herzegh | Nov. 6, 1956 |
| 2,798,528 | Herzegh | July 9, 1957 |
| 2,837,134 | Steer | June 2, 1958 |
| 2,838,088 | McIntire | June 10, 1958 |
| 2,844,183 | McCord et al. | July 22, 1958 |

FOREIGN PATENTS

| | | |
|---|---|---|
| 1,117,971 | France | Mar. 5, 1956 |